United States Patent
Kirlew et al.

(10) Patent No.: US 9,689,366 B2
(45) Date of Patent: Jun. 27, 2017

(54) METHOD TO DECOUPLE BATTERY FROM HIGH LEVEL CRANKING CURRENTS OF DIESEL ENGINES

(71) Applicant: Unison Industries, LLC, Jacksonville, FL (US)

(72) Inventors: Patrick Kirlew, Jacksonville, FL (US); Michael Joseph Cochran, Jacksonville, FL (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 0 days.

(21) Appl. No.: 14/897,908

(22) PCT Filed: May 29, 2014

(86) PCT No.: PCT/US2014/039885
§ 371 (c)(1),
(2) Date: Dec. 11, 2015

(87) PCT Pub. No.: WO2014/200697
PCT Pub. Date: Dec. 18, 2014

(65) Prior Publication Data
US 2016/0138550 A1    May 19, 2016

Related U.S. Application Data

(60) Provisional application No. 61/834,839, filed on Jun. 13, 2013.

(51) Int. Cl.
*H02J 7/00* (2006.01)
*H02J 7/14* (2006.01)
(Continued)

(52) U.S. Cl.
CPC .......... *F02N 11/0866* (2013.01); *H02J 7/345* (2013.01)

(58) Field of Classification Search
CPC ......... H02J 3/383; H02J 7/345; H01L 31/042; F02N 11/0866
(Continued)

(56) References Cited

U.S. PATENT DOCUMENTS 3,863,077 A * 1/1975 Bienkowski .......... F02N 11/105
290/37 R
3,893,428 A * 7/1975 Markus .................. F02B 53/10
123/206
(Continued)

FOREIGN PATENT DOCUMENTS

DE         10305058 B3    3/2004
DE     102009044211 A1    4/2010

OTHER PUBLICATIONS

International Search Report and Written Opinion issued in connection with corresponding PCT application PCT/US2014/039885 dated Oct. 6, 2014.

*Primary Examiner* — M'Baye Diao
(74) *Attorney, Agent, or Firm* — GE Global Patent Operation; William S. Munnerlyn (57) ABSTRACT

A method of decoupling a battery during high current cranking of an engine comprises charging a supercapacitor bank to a preselected DC supercapacitor voltage from a battery when said battery is above a preselected battery voltage, switching the supercapacitor bank to a load and switching the battery off the load, starting the engine and supplying initial voltage and current until terminal voltage of the supercapacitor is equal to terminal voltage of the battery, switching the battery into parallel with the supercapacitor, disconnecting the supercapacitor from the load, and recharging the supercapacitor to the preselected DC capacitor voltage.

12 Claims, 7 Drawing Sheets

(51) Int. Cl.
*F02N 11/00* (2006.01)
*F02N 11/08* (2006.01)
*H02J 7/34* (2006.01)

(58) Field of Classification Search
USPC .................. 320/167, 166, 104; 290/38 R
See application file for complete search history.

(56) References Cited

U.S. PATENT DOCUMENTS

| | | | |
|---|---|---|---|
| 4,567,476 A * | 1/1986 | Lang .................. | G01R 15/04 340/514 |
| 5,146,095 A * | 9/1992 | Tsuchiya ............ | F02N 11/0866 290/38 R |
| 5,444,595 A * | 8/1995 | Ishikawa ............ | H03K 17/0822 361/86 |
| 5,446,365 A * | 8/1995 | Nomura .............. | B60L 7/12 320/128 |
| 6,484,707 B1 * | 11/2002 | Frus .................. | F02P 3/02 123/597 |
| 7,319,306 B1 | 1/2008 | Rydman | |
| 7,963,264 B2 * | 6/2011 | Reynolds ........... | F02N 11/0866 123/179.3 |
| 8,076,908 B2 * | 12/2011 | Przywecki .......... | H02J 7/1423 307/44 |
| 8,179,103 B2 * | 5/2012 | Doljack ............. | F02N 11/0866 320/104 |
| 9,156,356 B2 * | 10/2015 | Rini .................. | H02J 7/0031 |
| 9,300,018 B2 * | 3/2016 | Watson .............. | H01M 2/1072 |
| 2003/0042742 A1 * | 3/2003 | Shimizu ............. | H02P 9/305 290/41 |
| 2004/0120167 A1 * | 6/2004 | Nakamura .......... | H02M 1/36 363/37 |
| 2008/0079389 A1 * | 4/2008 | Howell .............. | H02J 7/1438 320/104 |
| 2012/0037438 A1 * | 2/2012 | Schultz .............. | B60K 6/28 180/65.22 |

* cited by examiner

METHOD TO DECOUPLE BATTERY FROM HIGH LEVEL CRANKING CURRENTS OF DIESEL ENGINES

CROSS-REFERENCE TO RELATED APPLICATIONS

This is a national stage application under 35 U.S.C. §371(c) of prior filed, co-pending PCT application serial number PCT/US2014/039885, filed on May 29, 2014, which claims priority to U.S. Patent Application Ser. No. 61/834,839, titled "Method to Decouple Battery from High Level Cranking Currents of Diesel Engines" and having filing date Jun. 13, 2013, all of which is incorporated by reference herein.

BACKGROUND

The disclosed embodiments generally pertain to a cranking circuit for an engine. More particularly, but not by way of limitation, present embodiments relate to a method of decoupling a battery from the high level currents of an engine, for example a diesel engine.

In certain combustion engines, batteries utilized to start the engine may experience severe charge/recharge cycles and very high peak current discharges of up to thirty times daily. This occurs in part because there is a desire to conserve fuel in the engines, for example by turning off locomotive diesel engines when the locomotive is not moving a load. As a result, these high numbers of restarts may occur every day.

Each cycle places additional stress on the battery. For example, during these start cycles, batteries may exceed 1300 amps peak and may see severe loads. Over time, these repeated cycles and high stress loads result in significant limitation of the battery life.

During the life of the battery, problems associated with the above cycles and loadings include, but are not limited to, repeated recharging of batteries, decreased capacity, unreliable engine starts or failures to start and shortened battery life. In the field of locomotive transport, these problems cause transit delays which are extremely expensive for railroad companies, for example. Finally, due to the severe load and high number of recharging cycles, constant battery preventive maintenance is a continual problem.

It would be desirable to overcome these and other known issues associated with cranking circuits of engines and additionally reduce stress on batteries, improved battery life and reduce unstable or dead batteries and failure to start incidents.

It would further be desirable to decouple the battery from these circuits, however a source needs to be provided which facilitates starting of the engine, for example a diesel engine.

In addition to these goals, it is also desirable to provide a more reliable first time start which may require increasing voltage to the load or starter.

The information included in this Background section of the specification, including any references cited herein and any description or discussion thereof, is included for technical reference purposes only and is not to be regarded subject matter by which the scope of the invention is to be bound.

SUMMARY OF THE INVENTION

A method is provided for electrically connecting a supercapacitor to a load, for example for starting an engine. The supercapacitor is used to provide starting power for the engine until the supercapacitor discharges to a preselected voltage. At this time, a battery connects in parallel with the supercapacitor to aid in starting the engine. Once the engine is started, the supercapacitor is then disconnected from the load and recharged.

A method of decoupling a battery during high current cranking of an engine comprises charging a capacitor bank to a preselected DC supercapacitor voltage from a battery when the battery is above a preselected battery voltage, switching the supercapacitor bank to a load and switching the battery off the load, starting the engine and supplying initial voltage and current until terminal voltage of the supercapacitor is equal to terminal voltage of the battery, switching the battery into parallel with the supercapacitor, disconnecting the supercapacitor from the load, and recharging the supercapacitor to the preselected DC capacitor voltage.

Optionally, the switching may occur with at least one of a relay or contactor. The method may further comprise determining a voltage across the battery. The method may further comprise determining a current output from the battery. The method may further comprise determining a voltage across the supercapacitor. The method may further comprise determining a current output from the supercapacitor. The method may further comprise inputting a terminal voltage of the battery and the supercapacitor into a controller. The controller may be one of discrete logic or programmable logic array. The method may further utilize a housekeeping power supply. The housekeeping power supply may be one of a pulse width modulated multi output converter supplying voltage and current levels sufficient for the control logic and relays, or a linear supply derived from the battery or an external source. The engine may be a diesel engine or may be a locomotive engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The above-mentioned and other features and advantages of these exemplary embodiments, and the manner of attaining them, will become more apparent and the method of decoupling a battery from high level cranking currents will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that embodiments of the present invention covers such modifications and variations as come within the scope of the appended claims and their equivalents.

Referring to FIGS. 1-11, various methods and circuits for decoupling batteries from high level cranking currents of an engine are depicted. The instant methods and circuits allow mitigation of stress placed on batteries and improved battery life while reducing the number of dead battery starts for an engine. The engine may be a combustion engine and may, more specifically, be a diesel combustion type or a gasoline combustion type. Any such engine may be suitable wherein the starting currents are of a high level and wherein one or more batteries see severe loading during the starting process. Instant embodiments utilize a supercapacitor connectable in parallel with one or more batteries so that the high peak current incurred by the one or more batteries during a cranking process do not adversely affect the one or more batteries in a way that is currently occurring in known cranking circuits having high current levels.

Figure 1:
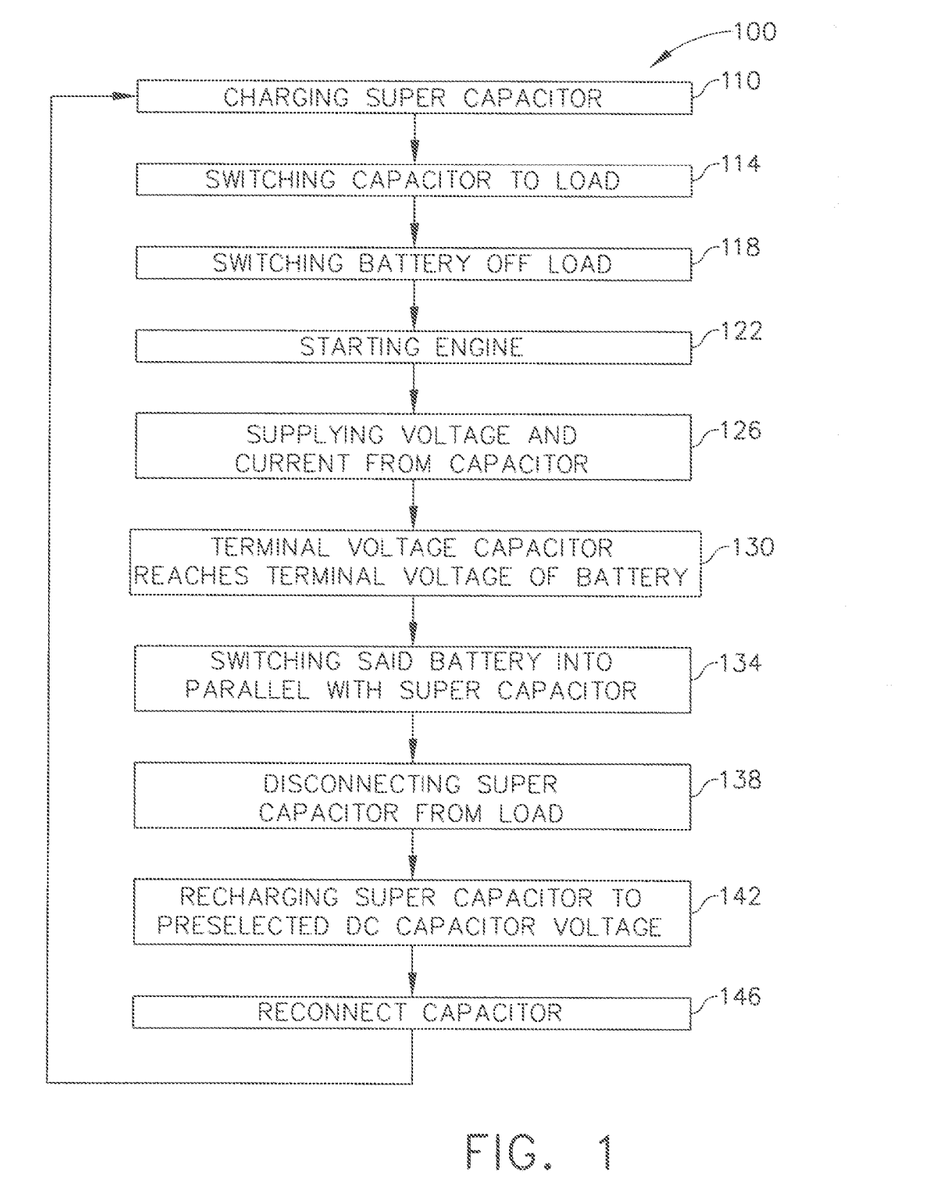
FIG. 1 a flow chart of an embodiment of decoupling a battery and cranking a high current circuit.

Referring initially to FIG. 1, a flow chart depicts a schematic representation of the method of decoupling a battery from a high level cranking current engine. The description is provided in combination with the components of FIG. 2 which shows one embodiment of a cranking circuit 10. The method 100 involves charging an ultracapacitor or capacitor bank 18 to a preselected direct current (DC) capacitor voltage at step 110. Supercapacitors comprise a family of electrochemical capacitors. Supercapacitors, sometimes called ultracapacitors or electric double-layer capacitor (EDLC) don't have a conventional solid dielectric. The capacitance value of an electrochemical capacitor is determined by two storage principles, both of which contribute to the total capacitance of the capacitor. Supercapacitors bridge the gap between conventional capacitors and rechargeable batteries. They have the highest available capacitance values per unit volume and the greatest energy density of all capacitors. They support up to 12,000 Farads/1.2 Volts, with capacitance values up to 10,000 times that of electrolytic capacitors. While existing supercapacitors have energy densities that approach 10% of conventional battery, their power density is generally 10 to 100 times greater. Power density is defined as the product of energy density, multiplied by the speed at which the energy is delivered to the load. The greater power density results in much shorter charge/discharge cycles than capable with a battery, and a greater tolerance for numerous charge/discharge cycles. The capacitor bank 18 may be charged from one or more batteries 12 in the cranking circuit 10 when the one or more batteries 12 are above a preselected battery voltage. According to some examples, the capacitor bank 18 may be charged to a preselected capacitor bank voltage, for example 80 V DC, by using a constant current converter or boost charger 16 having an internal boost mode. This may be desirable since in an embodiment the one or more batteries are rated at 64 Volts. According to one embodiment, the one or more batteries 12 may be, for example, two series 32 V batteries having amp hour ratings of 600 amp hours. However various numbers of batteries may be used in various electrical communication arrangements. The charger circuit may be a pulse width modulated (PWM) DC to DC converter topology that allows boosting and constant current modes or constant voltage modes. Typical converter topologies include the forward, flyback, Sepic and boost topologies.

Figure 2:
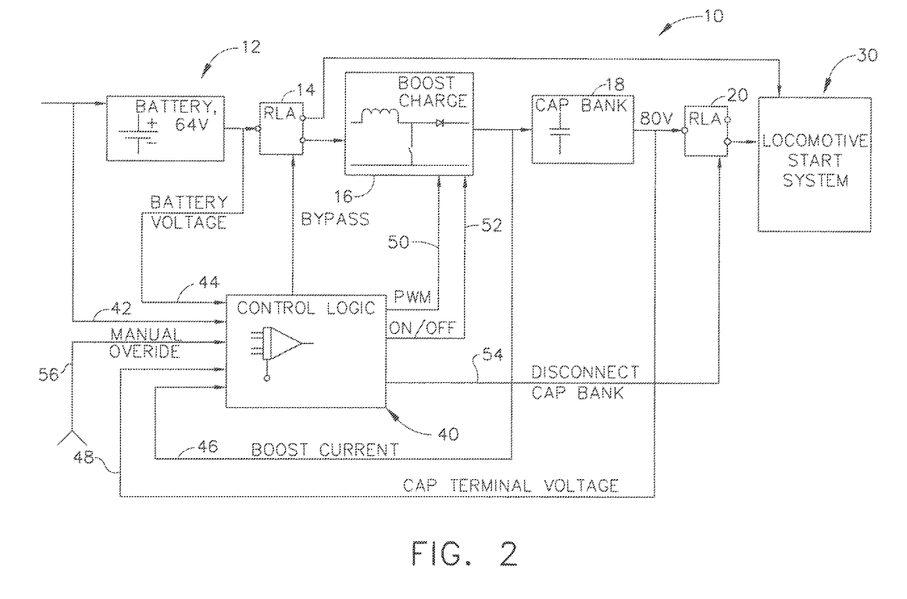
FIG. 2 is a schematic representation of an circuit for decoupling a battery from a high level cranking current circuit of an engine, for example a diesel engine.

According to the next step 114, the capacitor bank 18 is switched to the cranking load by a contactor or relay 20. This occurs once the capacitor 18 exceeds a preselected capacitor DC voltage, for example 75 V DC. At this time, the battery is switched off-load at step 118.

According to a subsequent step 122, the engine is attempted to be started and the supercapacitor 18 supplies an initial voltage and current at step 126 until the terminal voltage of the supercapacitor 18 is at the terminal voltage of the battery at step 130. More specifically, as the capacitor bank or supercapacitor 18 discharges from 80 V, and when the terminal voltage is at approximately 64 V or the preselected battery terminal voltage, the at least one battery 12 will switch in to assist the capacitor bank 18 in the starting sequence and share the starting load. Because of the lowering of the total ESR (Equivalent Series Resistance), that is the total additive series resistance of the wiring harness, capacitor and battery internal resistance, as seen by the load, the increase and available energy and current sharing from the two connected sources, the starting profile of the engine will be shorter and require much less energy than delivered by the batteries.

Next, at step 134, the at least one battery 12 is switched in parallel with the capacitor bank 18 and remains in this state until the engine 30, for example diesel locomotive engine, is started. Once the engine is started, the at least one battery 12 and capacitor bank 18 remain in this parallel state. The at least one battery 12 and capacitor bank 18 will disconnect from each other in the parallel mode and recharge the capacitor. The anticipated recharge time of the capacitor bank 18 to full charge or full preselected voltage, is about 15 minutes according to some embodiments.

When the engine is shut down, the capacitor bank 18 is disconnected from the load at step 138 and the capacitor bank 18 is recharged from the at least one battery 12 to the capacitor's higher preselected voltage, for example 80 V, at step 142. In order to charge, the battery 12 may be required to be above a minimum voltage, for example 35 Volts. It is desirable that the boost charger 16 step up the battery voltage to charge the capacitor bank 18 to a higher preselected capacitor voltage than the preselected battery voltage. Once the capacitor bank 18 is recharged to its preselected voltage, which may be 75 V or 80 V, the supercapacitor is reconnected to the load at step 146.

A manual override circuit 56 is provided with an input to the controller 40 allowing the control logic system to be shut off if needed. The manual override circuit 56 allows removal of the capacitor system for maintenance. Additionally, the controller may be disconnected from the cranking circuit 10 if there is a fault in the controller 40.

Figure 3:
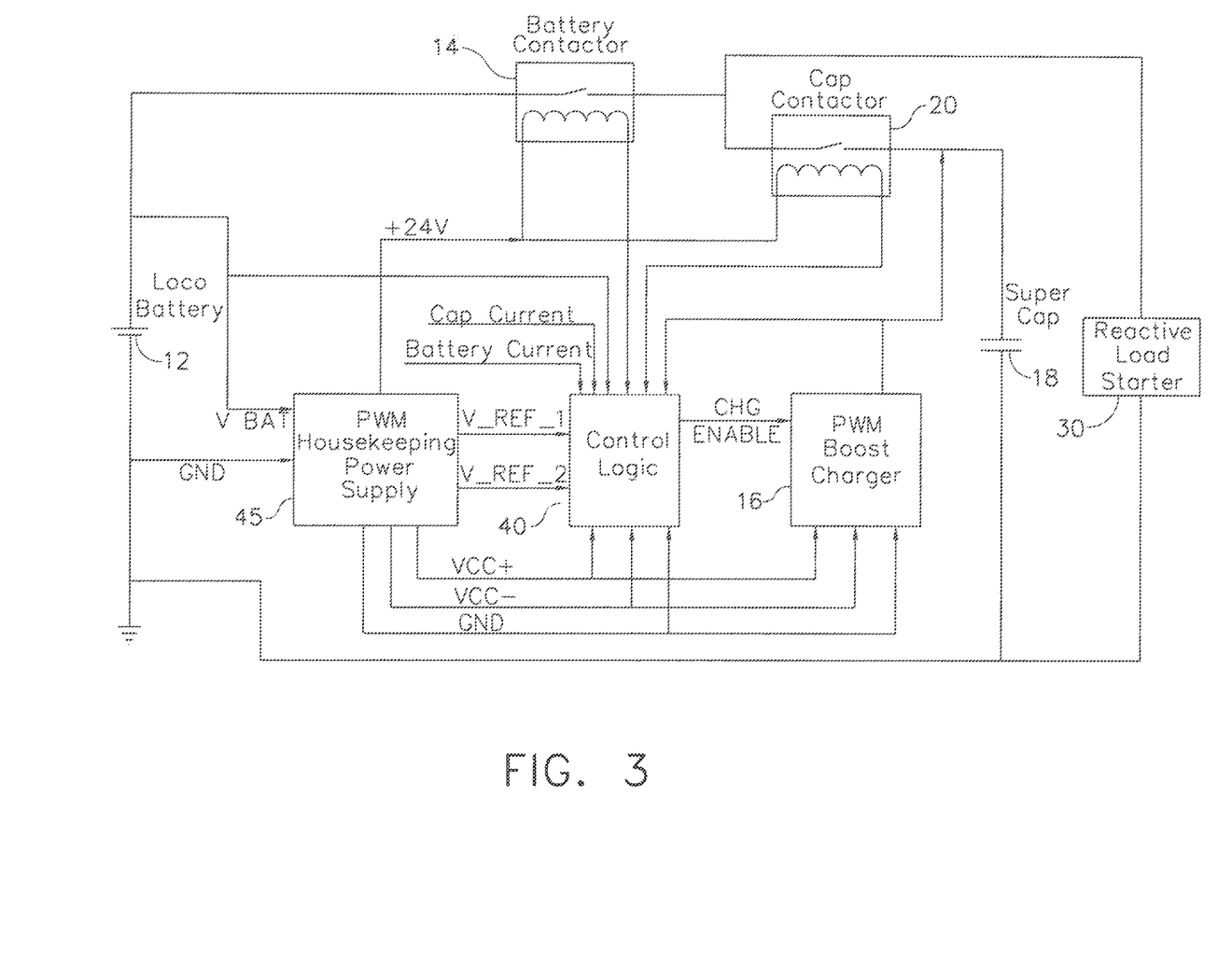
FIG. 3 is a detailed view of an embodiment of an circuit.

Referring now to FIG. 2, a schematic block diagram of a charging circuit is depicted. The circuit 10 includes one or more batteries 12 in series connection. In an embodiment, a 64 V battery is depicted, however this may be formed of two series connected 32 V batteries for example. The one or more batteries 12 are connected to a first connector or relay 14 which is in electrical communication with a boost charger 16 or a bypass path to the engine start system or load 30. The boost charger system 16 is in electrical communication with a capacitor bank 18. According to one example, the capacitor bank 18 may be a 94 Farad capacitor bank rated at 75 V nominal and 91 V maximum. The capacitor bank 18 may be charged to an initial voltage of 80 V DC to provide a total capacity of 108,288 joules before the battery is switched in. When the one or more batteries 12 are switched in, the battery 12 will be in parallel with a source that has a capacity of 192,512 joules. This would allow battery usage to be reduced by approximately 20% of its prior level according to analysis. The capacitor bank 18 is electrically connected to a second connector or relay 20 which is also in communication with the engine start system 30. Beneath the battery and boost charger 16 is a controller or logic controller 40. For example, controller 40 may be a discrete logic controller or a programmable logic controller. The controller is comprised of a variety of logic blocks, comparators, and differential amplifiers. The current in the capacitor circuit and the battery circuit and load, as well as the voltage levels of the battery and capacitor, is sensed using Hall Effect Sensors and resistors, and the signals are processed and scaled in the control section. These scaled signals are then compared to predetermined reference signals provided by the housekeeping power supply section 45, as shown in the embodiment of FIG. 3. According to some embodiments, the housekeeping power supply 45 may be one of a pulse with modulated multi-output converter supplying voltage and current levels sufficient for the control logic. Alternatively, the power supply 45 may be a linear supply from the battery or other external source. Based on the results of these comparisons, as determined in the logic section of the controller 40, the appropriate relay/relays are selected and the boost charge is activated or deactivated as required. The controller 40 receives an input from a first side of the at least one battery 12 at input 42 and from a second side of the at least one battery 12 at a second input 44 to read a voltage differential across the at least one battery 12. One or both of the inputs may also be used to read the battery current. The controller 40 also has inputs 46 and 48. The input signal 46 determines a voltage between the boost charger 16 and the capacitor bank 18 which effectively represents a voltage at the first side of the capacitor bank 18. The input signal 48 measures capacitor terminal voltage downstream of the capacitor bank 18 to provide a second position wherein a differential may be determined across the capacitor bank 18. These signals allow the controller 40 to determine a differential across the capacitor bank 18 as well as a current.

On the output side of the controller 40 is a pulse-width modulator (PWM) signal 50 in electrical communication with the boost charger 16. The pulse-width modulation signal 50 provides Mosfet Gate control signals for duty cycle control of the charging current function. The output side of the controller 40 also comprises a signal 52 in communication with the boost charger 16 to turn the charger 16 on and off as needed according to the control logic 40. Additionally, a switch circuit 54 connects the controller 40 with the second relay 20 to connect or disconnect the capacitor bank 18.

Figure 4:
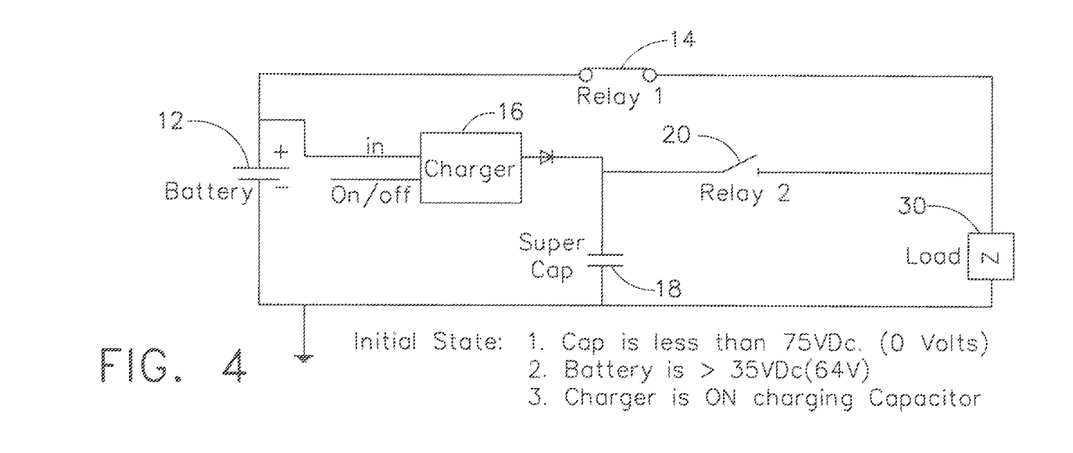
FIGS. 4, 5, 6, 7, 8, 9, 10 and 11 are sequence views of the operation of a circuit in different steps of the starting sequence.

Referring now to FIGS. 4-11, various views are depicted with the sequencing of a circuit during the various steps of operation. With reference first to FIG. 4, the battery 12 is shown operably connected to the boost charger 16 and the relay 14. The first relay 14 is closed and the second relay 20 is open. In this condition, the capacitor bank is less than 75 VDc. In this example the battery 12 is at a voltage of greater than a preselected amount, such as 35 VDc and thus may be used to charge the capacitor bank 18. The second relay 20 is open so that in its undercharged state, the capacitor bank 18 is not connected to the load 30, for example engine starter.

Figure 5:
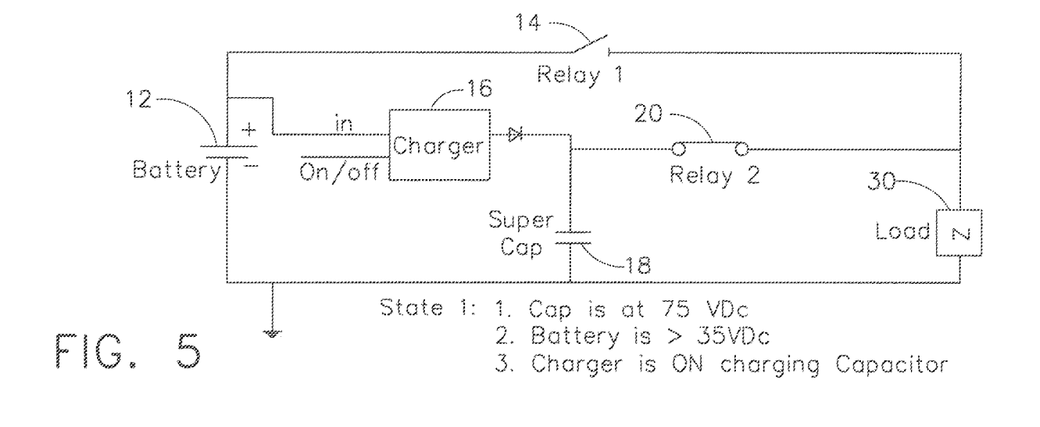

Referring now to FIG. 5, the circuit is shown again in a different time of the sequence. The first relay 14 is moved to the open position and the second relay 20 is closed. In this portion of the sequence, the capacitor bank 18 is charged to the minimum preselected capacitor voltage, for example 75 VDc. The battery 12 is still at a voltage greater than 35 VDc. The boost charger 16 is on and charging the capacitor 18 by way of the battery 12. In this state, the battery 12 is not connected to the load 30, for example engine starter.

Figure 6:
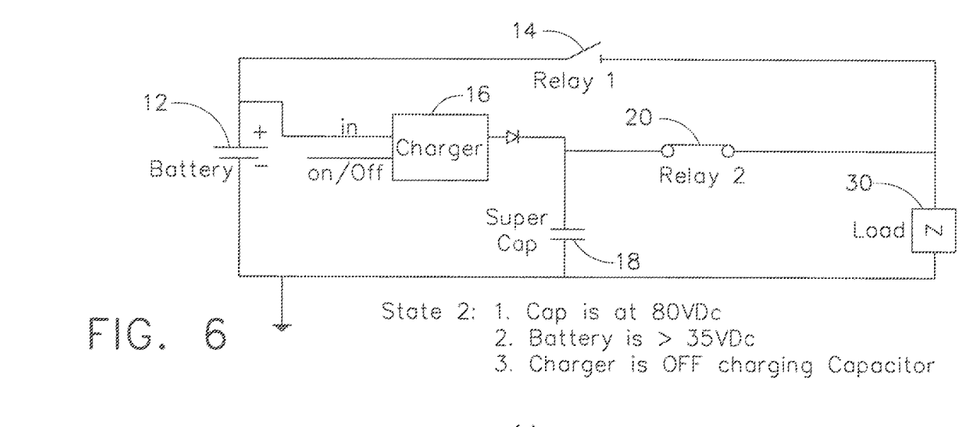

Referring now to FIG. 6, the preselected capacitor voltage is at 80 VDc. In this voltage, the charger 16 is turned off and the battery 12 remains disconnected from the load 30. The capacitor 18 is connected to the load 30 for starting, for example.

Figure 7:
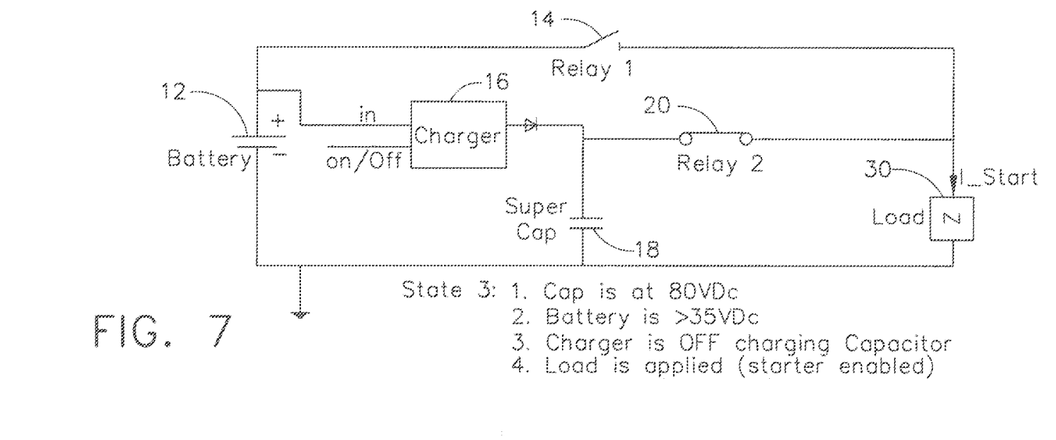
Figure 8:
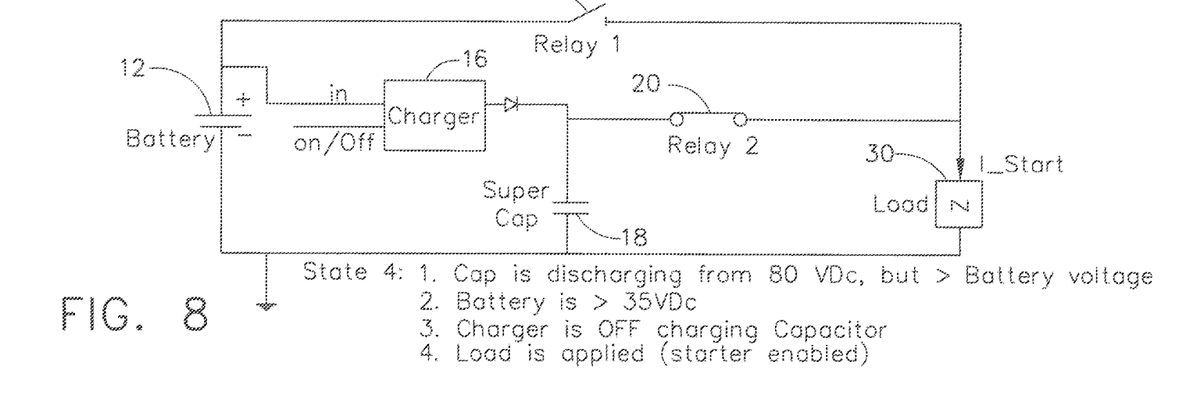

Referring now to FIG. 7, the first relay 14 is still in an open position, and the second relay 20 closed. The boost charger 16 is turned off since the capacitor bank 18 is still charged to 80 VDc. In this step, the load 30 is applied to the capacitor 18 by starting the engine. With reference to FIGS. 7-8, as the load 30 is being applied to the capacitor bank 18, the voltage of the capacitor 18 is dropping from 80 VDc. In these views the voltage of the capacitor bank 18 is still above the voltage of the battery 12.

Figure 9:
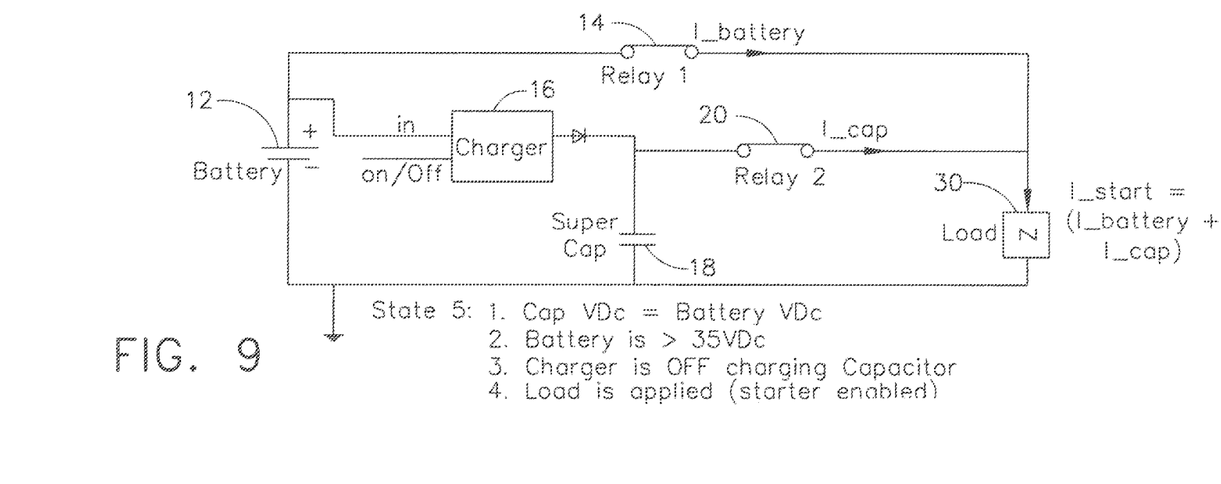

Referring now to FIG. 9, the first relay 14 is closed and the second relay 20 is closed. As compared to FIG. 8, the first relay 14 closes when the voltage of the capacitor 18 is equal to the battery voltage. Additionally, the logic controller 40 (FIGS. 2 and 3) requires the battery 12 to be at a voltage greater than some preselected value, for example 35 VDc. At this time, the battery 12 and capacitor bank 18 are both electrically connected to the load 30. Thus the battery 12 will share a portion of the starting load with the capacitor 18. This results in smaller load on the battery 12, less stress, fewer charge/recharge cycles and a longer life for the battery.

Figure 10:
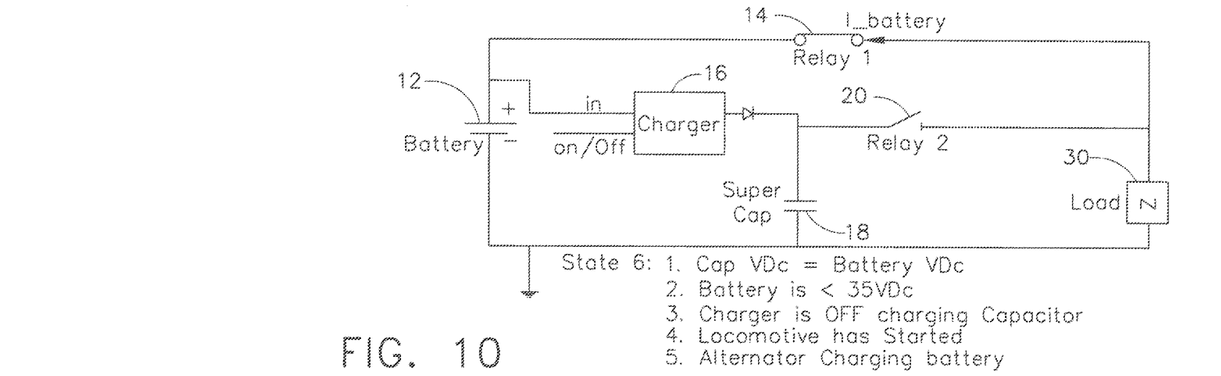

Referring now to FIG. 10, the second relay 20 is disconnected and the first relay 14 remains connected to load 30. In this state, the alternator is charging the battery 12 and the boost charger 16 is not charging the capacitor bank 18. In this condition, the capacitor voltage is equal to the battery voltage.

Figure 11:
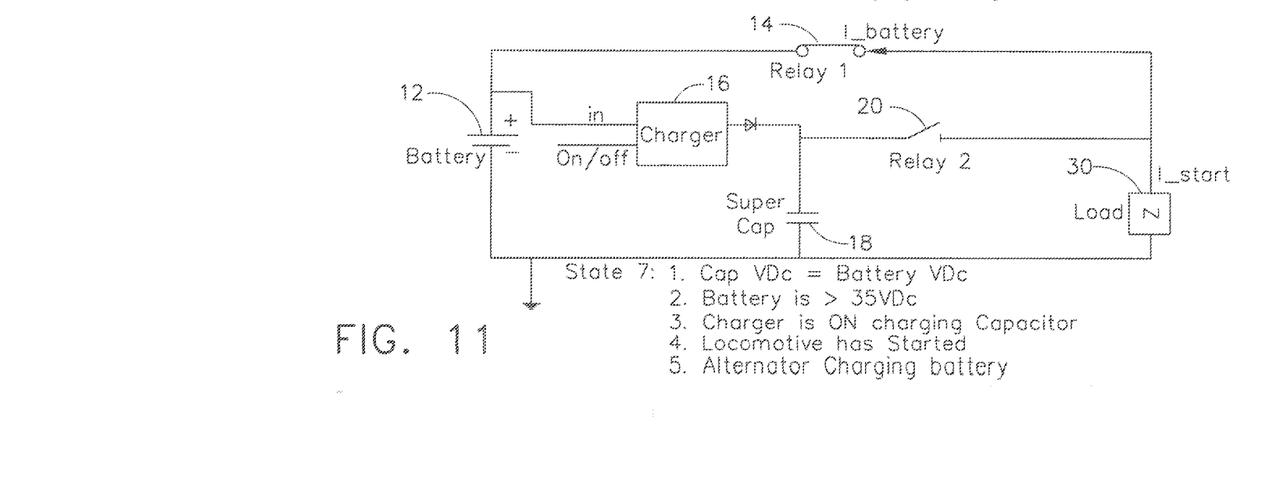

Referring now to FIG. 11, the second relay 20 is disconnected. The charger 16 is on and charging the capacitor 18 up toward the preselected voltage, for example 80 VDc. Once this voltage is reached, the first relay 14 will disconnect and the second relay 20 will connect to the load 30 so that the capacitor bank 18 can start the engine when needed. The process continues in this cycle.

The instant cranking circuit 10 provides various advantages over known high current cranking circuits. The circuit 10 allows mitigation of stress placed on batteries and improves battery life while reducing the number of dead battery starts for an engine. In the field of locomotive transport, for example, transit delays which are extremely expensive for railroad companies, will be reduced and problems and costs associated with battery preventive maintenance will be reduced. All of these problems will be resolved while improving starting of the engines at issue.

Theoretically, the system or circuit 10 will provide about 56% more energy capability to the start circuit allowing the engine to start quicker than when utilized with battery terminal voltage only.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of decoupling a battery during high current cranking of an engine, comprises:
   charging a supercapacitor to a preselected DC supercapacitor voltage from a battery when said battery is above a preselected battery voltage;
   switching the supercapacitor to a load and switching said battery off said load;
   starting said engine and supplying initial voltage and current until terminal voltage of the supercapacitor is equal to terminal voltage of said battery;
   switching said battery to said load in parallel with said supercapacitor;
   disconnecting only said supercapacitor from said load; and,
   recharging said supercapacitor to said preselected DC capacitor voltage.

2. The method of claim 1, said switching occurring with at least one of a relay or contactor.

3. The method of claim 1, further comprising determining a voltage across said battery.

4. The method of claim 3, further comprising determining a current output from said battery.

5. The method of claim 1, further comprising determining a voltage across said supercapacitor.

6. The method of claim 5, further comprising determining a current output from said supercapacitor.

7. The method of claim 1, further comprising inputting a terminal voltage of said battery and said supercapacitor into a controller.

8. The method of claim 7 wherein said controller is one of discrete logic or programmable logic array.

9. The method of claim 8, further comprising a housekeeping power supply.

10. The method of claim 9 wherein said housekeeping power supply is one of a pulse width modulated multi output converter supplying voltage and current levels sufficient for the control logic and relays, or a linear supply derived from the battery or an external source.

11. The method of claim 1, said engine being a diesel engine.

12. The method of claim 11, said engine being locomotive engine.

* * * * *